Sept. 23, 1941.  M. FREEMAN ET AL  2,257,002
NOVELTY PIN CONSTRUCTION
Filed June 10, 1941
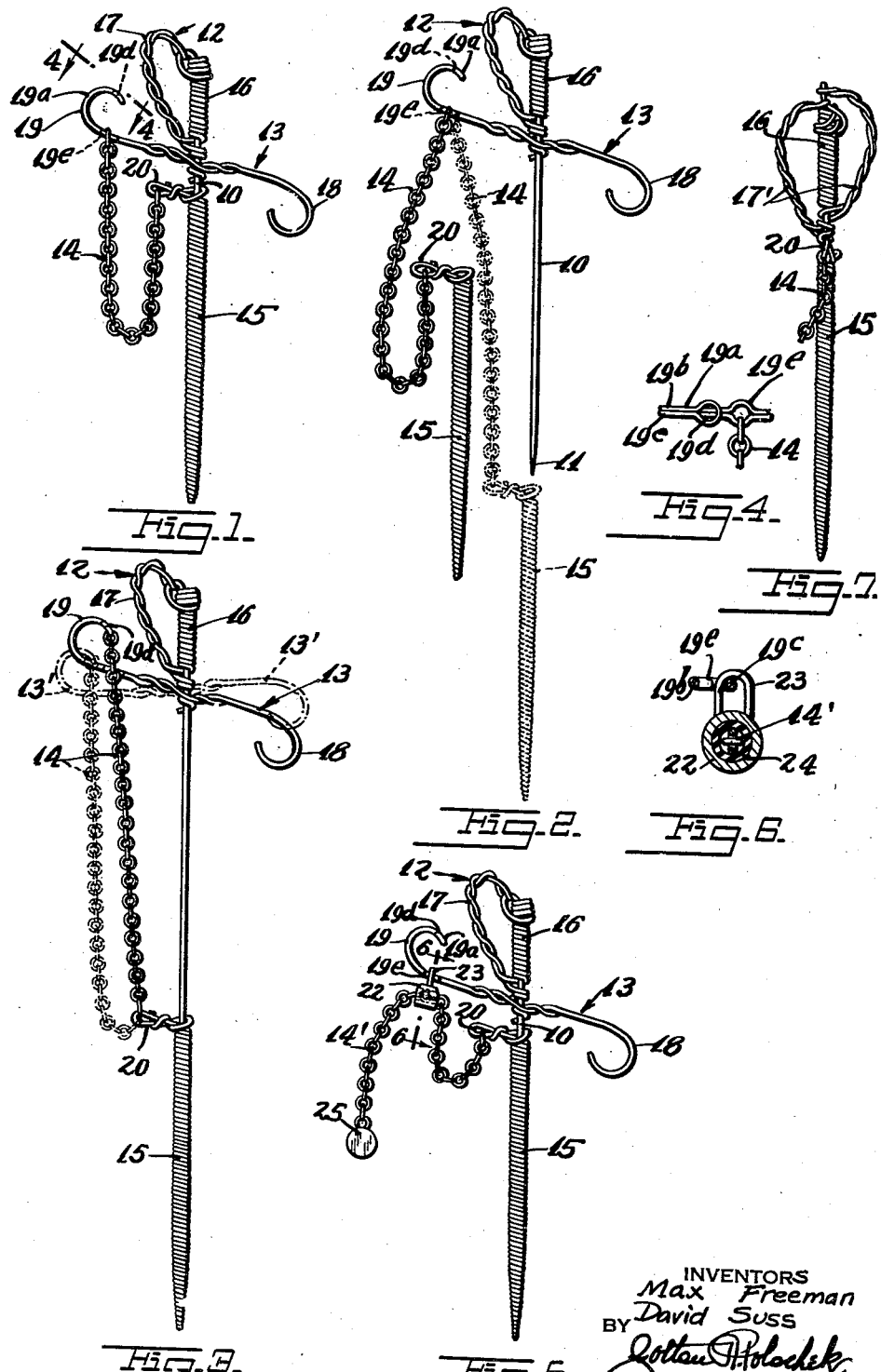
INVENTORS
Max Freeman
David Suss
BY
ATTORNEY Patented Sept. 23, 1941

2,257,002

UNITED STATES PATENT OFFICE 2,257,002

NOVELTY PIN CONSTRUCTION

Max Freeman and David Suss, New York, N. Y.

Application June 10, 1941, Serial No. 397,376

8 Claims. (Cl. 63—20)

This invention relates to new and useful improvements in a novelty pin construction.

The invention proposes a novelty pin characterized by a pin shank with a handle mounted on its rear end, and also provided with a wire shield mounted transversely of the pin adjacent the front of the handle, and a sheath for engaging over the pin shank and supported by a chain connected with said wire shield.

More specifically, it is proposed that both the handle and the shield be formed from a close wound strand of wire.

Still further the invention proposes to construct the shield from wire, preferably continued from the material of the handle and so arranged that the shield is slightly flexible. An arrangement is also proposed whereby the chain may be shifted to different positions on the shield for holding the sheath in a certain way in relation to the pin shank.

Still further the invention contemplates modified forms embodying the characteristic features mentioned above.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a novelty pin constructed in accordance with this invention.

Fig. 2 is a side elevational view similar to Fig. 1 but illustrated with the sheath removed.

Fig. 3 is a side elevational view similar to Fig. 1 but illustrated with the parts in a different position.

Fig. 4 is a fragmentary elevational view looking in the direction of the line 4—4 of Fig. 1.

Fig. 5 is a side elevational view of a novelty pin constructed in accordance with a modified form of this invention.

Fig. 6 is a fragmentary enlarged vertical sectional view taken on the line 6—6 of Fig. 5.

Fig. 7 is a front elevational view of a novelty pin constructed in accordance with another form of the invention.

The novelty pin construction, in accordance with this invention, includes a pin shank 10 having a pointed front end 11. A handle 12 is mounted in the rear end of the pin shank 10. A wire shield 13 is flexibly mounted transversely of the pin shank 10 adjacent the front of the handle 12. A chain 14 is connected with the wire shield 13. A sheath 15 is attached to the chain 14 and is adapted to engage over the pin shank 10.

The pin shank 10 preferably is formed from steel. The handle 12 is formed from a wire strand having a close wound portion 16 engaged around the rear end of the pin shank 10. The handle 12 is also provided with a twisted loop portion 17 connected between the front and rear ends of the close wound portion 16. The wire shield 13 is formed from a strand of wire having side portions 18 and 19. The side portion 19 extends rearwardly in relation to the pin shank 10. The side portion 19 is formed with a hook 19a extending in said rearward direction.

The side portion 19 is also formed from adjacent sections 19b and 19c of the strand of wire. These adjacent sections have a loop portion 19d at the end of the hook 19a and another loop portion 19e intermediate the shank of the hook portion 19a. The chain 14 has its first link engaged around the section 19c and is normally disposed in a loop 19e. When desired the chain may be slipped along the side portion 19 so that its first link passes between the sections 19b and 19c and engages into the loop 19d. Fig. 3 illustrates the parts in this position.

The sheath 15 is formed from a strand of close wound wire. At the top end the strand terminates in a laterally projecting loop portion 20. The chain 14 connects with this loop portion 20. The chain 14 is of such length that when it is connected with the loop 19e, the sheath 15 may be slipped off of the pin shank 10, as indicated in Fig. 2. However, when the chain 14 is connected with loop 19d the chain 14 is too short to allow the sheath 15 to be slipped off the pointed end of the pin. The parts can only reach the position indicated by the full lines in Fig. 3. However, with the parts in this position it is possible to flex the wire shield 13 to the dot and dash line position 13' and then the sheath 15 may be slipped off the pin shank 10.

In Figs. 5 and 6 a modified form of the invention has been disclosed which distinguishes from the prior form in the fact that a tubular socket 22 slidably supports the chain 14'. This tubular socket 22 has a loop portion 23 which normally engages the loop 19e. The socket 22 may be shifted so that the loop 23 engages the loop 19d. The socket 22 is lined with friction material 24 such as rubber, to frictionally hold the chain 14 in various extended positions through the socket. The chain 14' has an enlarged member 25 on its free end to prevent complete disengagement from the socket.

In other respects this form of the invention is similar to the previous form and like parts are indicated by like reference numerals. The sheath 15 may be removed from the pin shank 10 by pulling the chain 14' until the member 25 engages the socket 22. When the sheath 15 is replaced, the chain 14' may be pulled to a position illustrated in Fig. 5 to prevent the sheath 15 from accidentally coming off the pin shank 10.

In Fig. 7, the handle 12 is provided with a pair of twisted loop portions 17' and is shown without the wire shield 13. In other respects, this form of the invention is similar to the previous forms and like parts are indicated by corresponding reference numerals.

It is to be understood that the shapes of the various parts may be changed as desired and may be made of any suitable material.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A novelty pin construction, comprising a pin shank having a pointed end, a handle mounted on the rear end of said pin shank, a wire shield mounted transversely on said pin shank adjacent the front of said handle, a chain mounted on said wire shield, and a sheath attached on said chain and adapted to engage over said pin shank.

2. A novelty pin construction, comprising a pin shank having a pointed end, a handle mounted on the rear end of said pin shank, a wire shield mounted transversely on said pin shank adjacent the front of said handle, a chain mounted on said wire shield, and a sheath attached on said chain and adapted to engage over said pin shank, said sheath being formed from a strand of wire close wound.

3. A novelty pin construction, comprising a pin shank having a pointed end, a handle mounted on the rear end of said pin shank, a wire shield mounted transversely on said pin shank adjacent the front of said handle, a chain mounted on said wire shield, and a sheath attached on said chain and adapted to engage over said pin shank, said handle being formed from a strand of wire having a close wound portion upon the rear end of said pin shank, and a twisted loop portion extended across the ends thereof.

4. A novelty pin construction, comprising a pin shank having a pointed front end, a handle mounted on the rear end of said pin shank, a wire shield flexibly mounted transversely on said pin shank adjacent the front of said handle and having a rearwardly extending side portion, a chain movably mounted on said wire shield, means for holding said chain on said rearwardly extending side portion and other portions of said wire shield, and a sheath attached on said chain for engaging over said pin shank.

5. A novelty pin construction, comprising a pin shank having a pointed front end, a handle mounted on the rear end of said pin shank, a wire shield flexibly mounted transversely on said pin shank adjacent the front of said handle and having a rearwardly extending side portion, a chain movably mounted on said wire shield, means for holding said chain on said rearwardly extending side portion and other portions of said wire shield, and a sheath attached on said chain for engaging over said pin shank, said rearwardly extended side portion being formed from adjacent sections having loop portions at spaced positions, and the first link of said chain being engaged in one of said loop portions and adapted to be shifted to the other of said loop portions, and comprising the holding means for said chain.

6. A novelty pin construction, comprising a pin shank having a pointed front end, a handle mounted on the rear end of said pin shank, a wire shield flexibly mounted transversely on said pin shank adjacent the front of said handle and having a rearwardly extending side portion, a chain movably mounted on said wire shield, means for holding said chain on said rearwardly extending side portion and other portions of said wire shield, and a sheath attached on said chain for engaging over said pin shank, said rearwardly extended side portion being formed from adjacent sections having loop portions at spaced positions, and the first link of said chain being engaged in one of said loop portions and adapted to be shifted to the other of said loop portions, and comprising the holding means for said chain, and said chain being of a length so that the sheath may come off the pin in one position of the chain, and is restrained from coming off in the other position of the chain.

7. A novelty pin construction, comprising a pin shank having a pointed front end, a handle mounted on the rear end of said pin shank, a wire shield flexibly mounted transversely on said pin shank adjacent the front of said handle and having a rearwardly extending side portion, a chain movably mounted on said wire shield, means for holding said chain on said rearwardly extending side portion and other portions of said wire shield, and a sheath attached on said chain for engaging over said pin shank, said rearwardly extending side portion being formed from adjacent sections having loop portions at spaced positions, and the first link of said chain being engaged in one of said loop portions and adapted to be shifted to the other of said loop portions, and comprising the holding means for said chain, and said chain being of a length so that the sheath may come off the pin in one position of the chain, and is restrained from coming off in the other position of the chain, and said wire shield being bendable in the latter position of the chain to a point which will permit the sheath to come off from said pin shank.

8. A novelty pin construction, comprising a pin shank having a pointed front end, a handle mounted on the rear end of said pin shank, a wire shield flexibly mounted transversely on said pin shank adjacent the front of said handle and having a rearwardly extending side portion, a chain movably mounted on said wire shield, means for holding said chain on said rearwardly extending side portion and other portions of said wire shield, and a sheath attached on said chain for engaging over said pin shank, said chain being frictionally engaged through a socket and said socket being mounted upon said side portion.

MAX FREEMAN.
DAVID SUSS.